Nov. 29, 1932.  P. RILEY  1,889,700

CHANGE SPEED GEAR MECHANISM

Filed March 3, 1932    2 Sheets-Sheet 1

Inventor
Percy Riley
by Mawhinney & Mawhinney
Attorneys

Nov. 29, 1932.     P. RILEY     1,889,700
CHANGE SPEED GEAR MECHANISM
Filed March 3, 1932     2 Sheets-Sheet 2
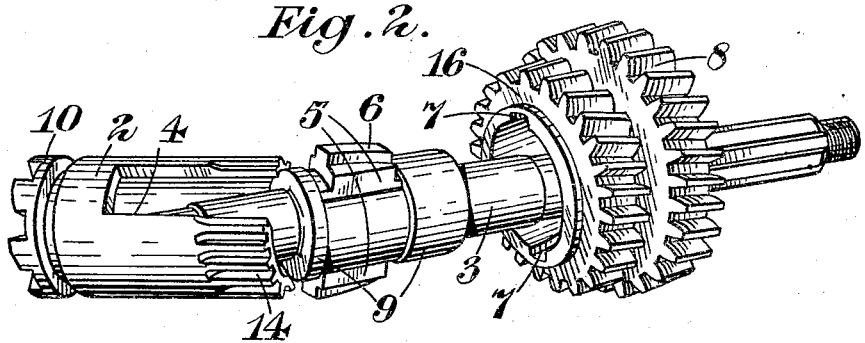
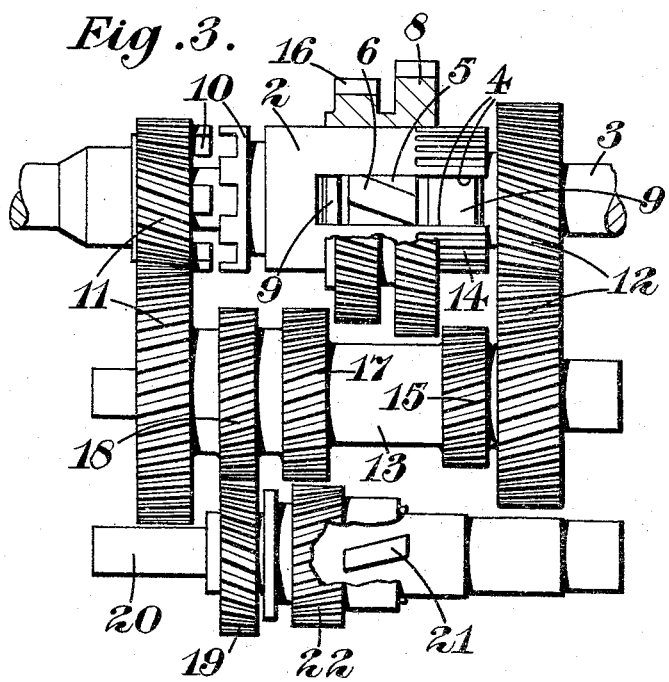
Inventor
Percy Riley
by Mawhinney & Mawhinney
Attorneys.

Patented Nov. 29, 1932

1,889,700

UNITED STATES PATENT OFFICE

PERCY RILEY, OF COVENTRY, ENGLAND

CHANGE SPEED GEAR MECHANISM

Application filed March 3, 1932, Serial No. 596,591, and in Great Britain August 27, 1931.

This invention relates to change-speed gear mechanisms and particularly to the kind having coaxial driving and driven shafts, which can be slidably clutched directly together, or indirectly through a parallel layshaft and two constant-mesh gear pairs, to give two speeds, say, top speed and next speed, and a gear pair, for another speed, usually a lower speed, of which one gear is slidable into and out of mesh with the other.

The chief object of the invention is to provide an arrangement of this kind in which, when all the gears have helical teeth, to ensure silent running, the end thrust will be self-contained with regard to the layshaft and striking forks.

The invention involves various improvements which are specifically pointed out in the claims, the nature of these improvements being hereinafter described in connection with the accompanying drawings.

According to one feature of the invention, the slidable gear, which is mounted on the driven shaft directly or indirectly, has a helical keyed or like connection therewith, while the slidable clutching member has a longitudinal keyed or like connection with the driven shaft. No claim is made alone to mounting a slidable helically-toothed gear on a helically-splined shaft.

The invention is further particularly applicable to change-speed gear mechanism of the kind having a double-ended clutch sleeve which is slidable on the driven shaft to lock the latter to the driving shaft for the top speed or to a loose gear on the driven shaft for the next speed, and which carries upon it the slidable gear, and the invention further involves providing a slot in the sleeve through which a key or the like on the driven shaft extends, the key being adapted to provide a driving connection both between the sleeve and the driven shaft and between the slidable gear and the driven shaft.

In the accompanying drawings,

Figure 2 is a perspective view showing the driven shaft, slidable clutch sleeve and slidable gear apart from one another, and Figure 3 is an elevation of the gears, corresponding to Figure 1, with the striking forks omitted and the intermediate or reverse shaft shown out of place.

Like numerals indicate like parts throughout the drawings.

Figure 1:
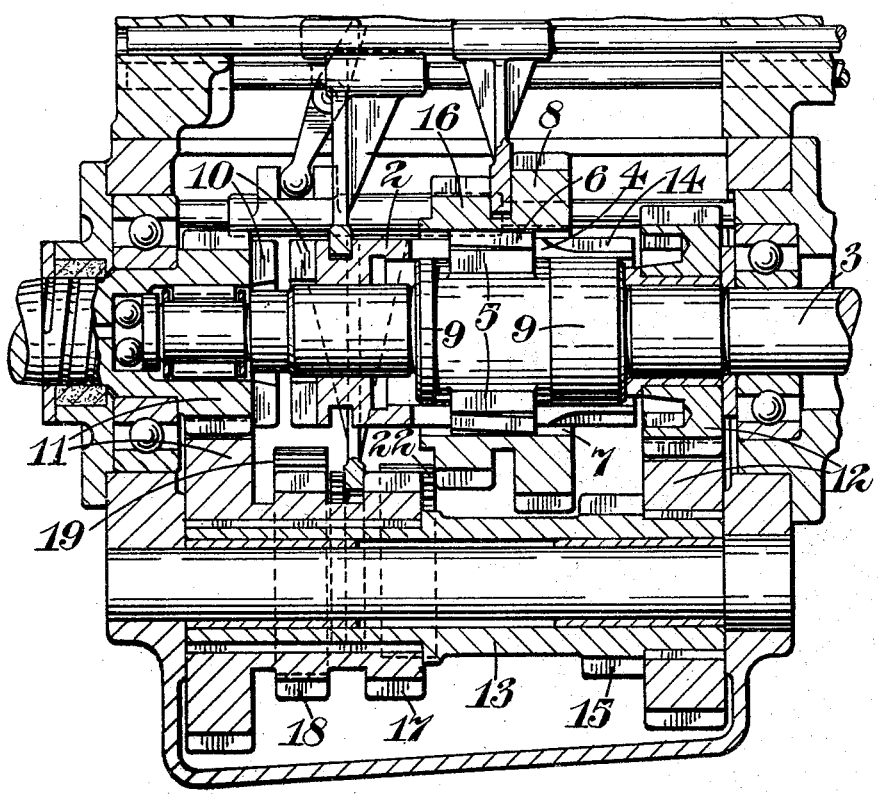
Figure 1 is a longitudinal section through a gear box embodying the invention.

The accompanying drawings show one arrangement according to the present invention applied to a change-speed gear mechanism of the kind described in British Patent specification No. 257,413, in respect whereof I am the patentee.

As illustrated, the splined connection between the double-ended dog clutch sleeve 2 and the driven shaft 3 takes the form of a longitudinal slot 4 in the sleeve, or more than one, two being here shown, and a corresponding longitudinal key 5 or keys on the driven shaft extending into the slot or slots. Each key is of sufficient width, where it rises clear of the sleeve, to have formed on its extremity a helical or inclined key portion 6 which engages a corresponding internal inclined slot 7 on the slidable gear 8 and thus provides a driving connection between the latter gear and the driven shaft. It would not be satisfactory to form the helical spline for the gear 8 on the clutch sleeve, as when the drive was being taken through the gear 8 an end thrust would be applied to the clutch sleeve.

In practice the driven shaft is preferably formed with an enlarged section where the double keys are, so that a small number of large keys will suffice for taking the torque. On each side of the keys at 9, 9 the enlarged portion of the driven shaft is machined to support the sleeve. The latter is also machined to support the slidable gear.

In the arrangement illustrated all the teeth of the gear wheels are assumed to be helical, those of the layshaft gears being all inclined in the same direction. When running in top speed no end thrust is introduced as the load is transmitted direct through the dogs 10. In the next speed, where the drive is taken through two constant-mesh gear pairs 11, 12 by way of the layshaft 13 and the dogs 14, the end thrusts on the layshaft are opposed. When the drive is taken through the next speed by way of the gear pair 11, the gear 15 fast on the layshaft, and the slidable gear 8, the thrusts on the layshaft are again opposed and those on the gear 8 substantially balanced out, the helical key 6 on the driven shaft being arranged to ensure this. Obviously in top speed or next speed there are no end thrusts on the clutch sleeve owing to its having a longitudinal splined connection with the driven shaft.

The benefit of the invention is also obtained in four-speed gear mechanisms of the kind where the slidable gear 8 is a double one (8, 16), as illustrated, the parts of which are adapted selectively to engage two different spaced gears 15, 17, respectively, fast on the layshaft. Obviously, to ensure that the end thrusts on each of the gears 8, 16 are balanced, the helix angle of the teeth of the larger wheel (8) will be slightly less than the helix angle of the smaller wheel (16) for a given helical key 6.

The reverse drive is preferably taken from a helically-toothed gear 18 fast on the layshaft to one 19 fast on an intermediate shaft 20 which carries through helical splines 21 a helically-toothed gear 22 slidable into and out of engagement with the sliding gear or one of the sliding gears, the larger one 8 in this case, on the driven shaft. The gear 18 on the layshaft preferably has its teeth arranged similarly to those of the other layshaft gears so that the end thrusts on the layshaft will still be opposed. The two gears on the intermediate shaft have their teeth arranged in opposite directions, and as the helical splines 21 are arranged so that the end thrusts on the slidable gear 22 will be balanced, the end thrusts applied to the intermediate shaft by the gear 19 and the splines 21 will not be opposed.

The unbalanced end thrusts on the driving and driven shafts and on the intermediate shaft 20, and the resultant end thrust, if any, on the layshaft, will, of course, be taken care of by the appropriate bearings in the casing.

It will be seen that, by means of the invention, a gear box which is very quiet at all speeds can be provided, and the end thrusts due to the use of helical teeth are opposed as regards the layshaft and the striking forks, so that wear will be reduced. No special provision will have to be made for holding the gear lever in the different gear positions.

What I claim as my invention and desire to secure by Letters Patent of the United States is:—

1. In change speed gear mechanism, a driven shaft, a clutch sleeve on the shaft and having longitudinal splined slots therein, spline keys carried by the driven shaft and having longitudinal portions slidably engaging in said slots of the sleeve to interlock the driven shaft and the sleeve for turning together, a gear slidably mounted on the sleeve and having internal helical spline slots, said keys having outer end helical splines projecting through the slots of the sleeve and engaging the helical slots within the gear for directly engaging the gear and the driven shaft independently of the clutch sleeve.

2. In change speed gear mechanism, a shaft having radial keys thereon, each key having an inner longitudinal spline and an outer helical spline extending beyond the longitudinal spline, a clutch sleeve slidably mounted on the shaft and having longitudinal spline slots therein for receiving said keys therethrough and with the longitudinal splines engaging the edges of the slots for interlocking the sleeve with the shaft, and a gear slidably mounted on the sleeve and having internal helical spline slots adapted to receive therein the helical splines of the keys, whereby said sleeve is splined to the shaft independently of the helical splined connection between the shaft and the gear.

3. In change speed gear mechanism, a shaft, a sleeve on said shaft, a gear on said sleeve, said sleeve and gear disposed concentrically upon the shaft and the sleeve having a longitudinal splined slot therein and the gear having a helical internal slot therein adapted to register with the slot of the sleeve, said shaft having a key projecting radially therefrom through said slot in the sleeve and into the slot of the gear, said key having a longitudinal splined portion to engage the sleeve and an outwardly projecting helical splined portion to engage the gear whereby to independently connect the sleeve and the gear to the shaft and admit of the independent movement of the gear and the sleeve on the shaft.

4. In change speed gear mechanism, a shaft, a clutch sleeve on the shaft, a slidable change speed gear mounted on the sleeve, and direct connections between the sleeve and the shaft and the gear and the shaft.

In testimony whereof I have signed my name to this specification.

PERCY RILEY.